US011734860B2

(12) United States Patent
Millette et al.

(10) Patent No.: US 11,734,860 B2
(45) Date of Patent: Aug. 22, 2023

(54) METHOD AND SYSTEM FOR GENERATING AN AUGMENTED REALITY IMAGE

(71) Applicant: CAE INC., Saint-Laurent (CA)

(72) Inventors: Alexandre Millette, Saint-Laurent (CA); Samuel Berube, Saint-Laurent (CA)

(73) Assignee: CAE INC., Saint-Laurent (CA)

( * ) Notice: Subject to any disclaimer, the term of this patent is extended or adjusted under 35 U.S.C. 154(b) by 0 days.

(21) Appl. No.: 17/130,062

(22) Filed: Dec. 22, 2020

(65) Prior Publication Data

US 2022/0198720 A1 Jun. 23, 2022

(51) Int. Cl.
  *G06T 11/00* (2006.01)
  *G06T 7/70* (2017.01)
  *G06T 7/90* (2017.01)

(52) U.S. Cl.
  CPC ........... *G06T 11/00* (2013.01); *G06T 7/70* (2017.01); *G06T 7/90* (2017.01); *G06T 2207/10024* (2013.01); *G06T 2207/30204* (2013.01)

(58) Field of Classification Search
  CPC ... G06T 11/00; G06T 7/90; G06T 7/70; G06T 2207/10024; G06T 2207/30204
  See application file for complete search history.

(56) References Cited

U.S. PATENT DOCUMENTS

| | | | |
|---|---|---|---|
| 9,995,936 B1 * | 6/2018 | Macannuco | G06F 3/013 |
| 10,970,883 B2 * | 4/2021 | Gade | G06T 7/246 |
| 2012/0069051 A1 * | 3/2012 | Hagbi | G06T 19/006 |
| | | | 345/633 |
| 2012/0092329 A1 * | 4/2012 | Koo | G06V 20/20 |
| | | | 345/419 |
| 2014/0003654 A1 * | 1/2014 | Beaurepaire | G06K 9/00664 |
| | | | 382/103 |
| 2015/0206329 A1 * | 7/2015 | Devries | G06F 16/583 |
| | | | 345/633 |
| 2017/0140793 A1 * | 5/2017 | Alleau | H04N 13/122 |
| 2017/0323481 A1 | 11/2017 | Tran et al. | |
| 2018/0228555 A1 * | 8/2018 | Charron | G06F 3/012 |
| 2018/0330515 A1 * | 11/2018 | Stall | G06T 19/003 |
| 2019/0050427 A1 * | 2/2019 | Wiesel | G06K 9/3241 |
| 2020/0388056 A1 * | 12/2020 | Glazberg | G06V 10/40 |

(Continued)

OTHER PUBLICATIONS

Y. A. Sekhavat, "Privacy Preserving Cloth Try-On Using Mobile Augmented Reality," in IEEE Transactions on Multimedia, vol. 19, No. 5, pp. 1041-1049, May 2017, doi: 10.1109/TMM.2016.2639380. (Year: 2017).*

(Continued)

*Primary Examiner* — Yu Chen
(74) *Attorney, Agent, or Firm* — Fasken Martineau Dumoulin LLP; Serge LaPointe (57) ABSTRACT

A system for generating an augmented reality image using an initial image comprising a reference element, the system comprising: an image analyzer for identifying the reference element within the initial image; an image generating unit for: generating a simulation image of a scene of a virtual environment based on the identified reference element, an outline of the simulation image corresponding to the reference outline; overlaying the initial image with the simulation image to obtain the augmented reality image; and providing the augmented reality image for display.

20 Claims, 8 Drawing Sheets

(56) References Cited

U.S. PATENT DOCUMENTS

2021/0166485 A1\* 6/2021 Islamov .................. H04N 5/272
2021/0287430 A1\* 9/2021 Li ........................... G06T 17/20
2021/0369353 A1\* 12/2021 Nikou .................... A61B 34/30

OTHER PUBLICATIONS

S. Hauswiesner, M. Straka and G. Reitmayr, "Virtual Try-On through Image-Based Rendering," in IEEE Transactions on Visualization and Computer Graphics, vol. 19, No. 9, pp. 1552-1565, Sep. 2013, doi: 10.1109/TVCG.2013.67. (Year: 2013).\*

Mellor, John. (2002), Enhanced Reality Visualization in a Surgical Environment [Master's thesis, Massachusetts Institute of Technology, Cambridge], Downloaded from https://www.researchgate.net/publication/2522673_Enhanced_Reality_Visualization_in_a_Surgical_Environment.

\* cited by examiner

METHOD AND SYSTEM FOR GENERATING AN AUGMENTED REALITY IMAGE

TECHNICAL FIELD

The present invention relates to the field of image generation, and more particularly to the generation of augmented reality images.

BACKGROUND

Augmented reality is an interactive experience of a real-world environment where the objects that reside in the real-world are "augmented" by computer-generated perceptual information. In the field of simulators such as aircraft simulators, augmented reality may be used to insert a virtual environment into a video captured by cameras. For example, the scene that would be seen by a user through a window of an aircraft may be simulated and inserted into a video of the cockpit.

In order to generate an augmented reality image, the simulated image usually acts as a background image and the image captured by the camera acts as the foreground image overlaying the background image. This implies that some parts of the foreground image are rendered transparent, as explained in greater detail below with respect to FIG. 1.

SUMMARY

There is described a method and a system for generating an augmented reality image. As described in detail below, the augmented reality image is generated by overlaying an initial image which may be a video frame with a simulation image. While for at least some of the methods of the prior art for generating an augmented reality image the required resources such as the required processing time and/or computational power are important and/or restrictive, the present method and system allow for less powerful computer equipment to be used for example. The saved resources may then be used for generating a higher definition simulation image in comparison to the prior art for example.

According to a first broad aspect, there is provided a computer-implemented method for generating an augmented reality image using an initial image comprising a reference element, the computer-implemented method comprising: identifying the reference element within the initial image; a reference outline being associated with the reference element; generating a simulation image of a scene of a virtual environment based on the identified reference element, an outline of the simulation image corresponding to the reference outline; overlaying the initial image with the simulation image to obtain the augmented reality image; and providing the augmented reality image for display.

In one embodiment, the steps of generating the simulation image and overlaying the initial image with the simulation image are performed concurrently by drawing the scene of the virtual environment over the reference element within the initial image.

In one embodiment, the step of generating the simulation image comprises: generating a first image of the scene of the virtual environment, an outline of the first image being larger than the reference outline; and downsizing the first image to obtain the simulation image. In another embodiment, the step of generating the simulation image comprises: generating a first image of the scene of the virtual environment, an outline of the first image being smaller than the reference outline; and expanding the first image to obtain the simulation image.

In one embodiment, the reference outline is different from a physical outline of the reference element, the computer-implemented method further comprising determining the reference outline.

In one embodiment, a position of the simulation image within the augmented reality image is different from a position of the reference element within the initial image, the computer-implemented method further comprising determining the position of the simulation image within the augmented reality image.

In one embodiment, the reference element is a marker.

In one embodiment, the marker comprises one of a barcode and a QR code.

In one embodiment, the reference outline is a physical outline of the reference element, and a position of the simulation image within the augmented reality image is identical to a position of the reference element within the initial image.

In one embodiment, the reference element comprises a representation of one of a screen, a window and a porthole.

In one embodiment, the step of generating the simulation image comprises: generating a first image of the scene having a rectangular shape, an outline of the first image being larger than the outline of the simulation image; and rendering transparent some pixels of the first image, thereby obtaining the simulation image.

In one embodiment, the step of identifying the reference element is performed using an object recognition method.

In one embodiment, the reference element is provided with a predefined color, said identifying the reference element comprising identifying image pixels having the predefined color within the initial image.

In one embodiment, the identified image pixels correspond to outline pixels of the reference element.

In one embodiment, the initial image comprises a video frame from a video.

In one embodiment, the initial image is associated with a line of sight of a user and the simulation image is generated further based on the line of sight of the user.

In one embodiment, the method further comprises the step of determining the line of sight of the user.

In one embodiment, the step of determining the line of sight of the user comprises measuring a position and an orientation of a head of the user.

According to another broad aspect, there is provided a system for generating an augmented reality image using an initial image comprising a reference element, the system comprising: an image analyzer for identifying the reference element within the initial image; an image generating unit for: generating a simulation image of a scene of a virtual environment based on the identified reference element, an outline of the simulation image corresponding to the reference outline; overlaying the initial image with the simulation image to obtain the augmented reality image; and providing the augmented reality image for display.

In one embodiment, the image generating unit is configured for drawing the scene of the virtual environment over the reference element within the initial image, thereby concurrently performing said generating the simulation image and said combining the initial image and the simulation image.

In one embodiment, the image generating unit comprises: a simulation image generator for generating the simulation image; and an image combiner for overlaying the initial image with the simulation image to obtain the augmented reality image and providing the augmented reality image for display.

In one embodiment, the simulation image generator is configured for: generating a first image of the scene of the virtual environment, an outline of the first image being larger than the reference outline; and downsizing the first image to obtain the simulation image. In another embodiment, the simulation image generator is configured for: generating a first image of the scene of the virtual environment, an outline of the first image being smaller than the reference outline; and expanding the first image to obtain the simulation image.

In one embodiment, the reference outline is different from a physical outline of the reference element, the image analyzer being further configured for determining the reference outline.

In one embodiment, a position of the simulation image within the augmented reality image is different from a position of the reference element within the initial image, the image analyzer being further configured for determining the position of the simulation image within the augmented reality image.

In one embodiment, the reference element is a marker.

In one embodiment, the marker comprises one of a barcode and a QR code.

In one embodiment, the reference outline is a physical outline of the reference element, and a position of the simulation image within the augmented reality image is identical to a position of the reference element within the initial image.

In one embodiment, the reference element comprises a representation of one of a screen, a window and a porthole.

In one embodiment, the simulation image generator is configured for: generating a first image of the scene having a rectangular shape, an outline of the first image being larger than the outline of the simulation image; and rendering transparent some pixels of the first image, thereby obtaining the simulation image.

In one embodiment, the image analyzer is configured for identifying the reference element using an object recognition method.

In one embodiment, the reference element is provided with a predefined color, said identifying the reference element comprising identifying image pixels having the predefined color within the initial image.

In one embodiment, the identified image pixels correspond to outline pixels of the reference element.

In one embodiment, the initial image comprises a video frame from a video.

In one embodiment, the initial image is associated with a line of sight of a user, the image generating unit being configured for generating the simulation image further based on the line of sight of the user.

In one embodiment, the system further comprises a tracking device for determining the line of sight of the user.

In one embodiment, the tracking device is a camera.

According to a further broad aspect, there is provided a computer program product for generating an augmented reality image using an initial image comprising a reference element, the computer program product comprising a non-volatile memory storing computer executable instructions thereon that when executed by a computer perform the method steps of: identifying the reference element within the initial image; a reference outline being associated with the reference element; generating a simulation image of a scene of a virtual environment based on the identified reference element, an outline of the simulation image corresponding to the reference outline; overlaying the initial image with the simulation image to obtain the augmented reality image; and providing the augmented reality image for display.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
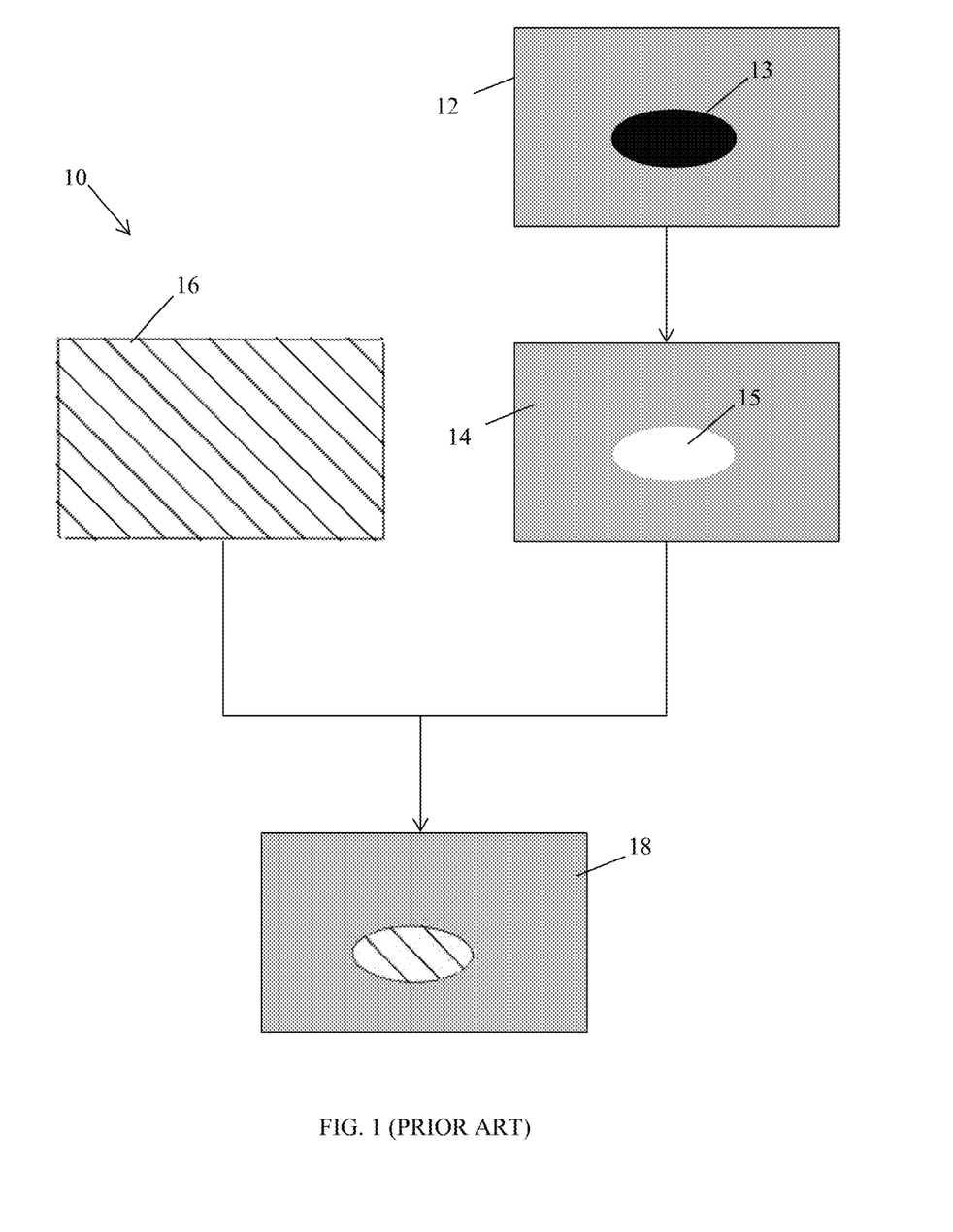
FIG. 1 is a conceptual diagram illustrating a prior art method for generating an augmented reality image.

FIG. 1 illustrates a prior art method 10 for generating an augmented reality image. An initial image 12 is received. The initial image 12 contains the representation of a portion of a colored screen 13 such as a green screen or a blue screen. For example, the initial image 12 may be a video frame of a live video. In the prior art method, the portion of the colored screen 13 is identified and rendered transparent to obtain the foreground image 14 comprising the transparent portion 15. Concurrently a background image 16 is generated. The background image 16 may be generated according to some characteristics of the initial image 12 such as an orientation associated with the initial image 12. However, the simulated image 16 is independent of the colored screen, i.e. the same simulated image 16 is generated independently of the presence of a colored screen portion 13 in the initial image 12 and/or independently of the size and/or position of the colored screen portion 13 within the initial image 12. The size of the simulated image 16 is the same as that of the background image 14. The simulated image 16 is used as a background image and is combined with the foreground image 14, i.e. the foreground image 14 is superimposed on the background image 16 to obtain the augmented reality image 18. As a result, within the augmented reality image 18, the simulated image 16 may be seen as a background image through the transparent window 15 of the foreground image 14.

The prior art method 10 is usually used in the context of simulation such as for the simulation of a vehicle such as an aircraft. In this case, a simulator comprises a frame reproducing the interior of a vehicle and the user is installed within the interior of the frame to follow a training. The interior wall of the frame may be provided with at least one colored screen to represent a window for example. The simulator then generates images to be displayed on the colored screen and the generated images may correspond to what would be seen by the user if he was in a real vehicle. For example, the generated images may correspond to images of an outdoor scene.

The user may be provided with a camera used to capture his field of view. For example, the camera may be mounted on the user's head or on a helmet to be worn by the user. In this case, the frames of the video outputted by the camera are exemplified by the initial image 12 described above. The simulator then generates the images to be displayed on the colored screen according to the field of view of the user, i.e. according to the positon and/or orientation of the camera.

In the prior art system, instances of the simulated image 16 generated by the simulator are identical for a same field of view of the user. In other words, the simulated image 16 generated by the simulator does not depend on the characteristics of the colored screen 13 such as its shape, size and/or location within the initial image 12 taken by the camera and the simulated image 16 has the same size as the initial image 12. As a result, the resources required by the prior art system such as the required processing time and/or computational power are important and/or restrictive.

Figure 2:
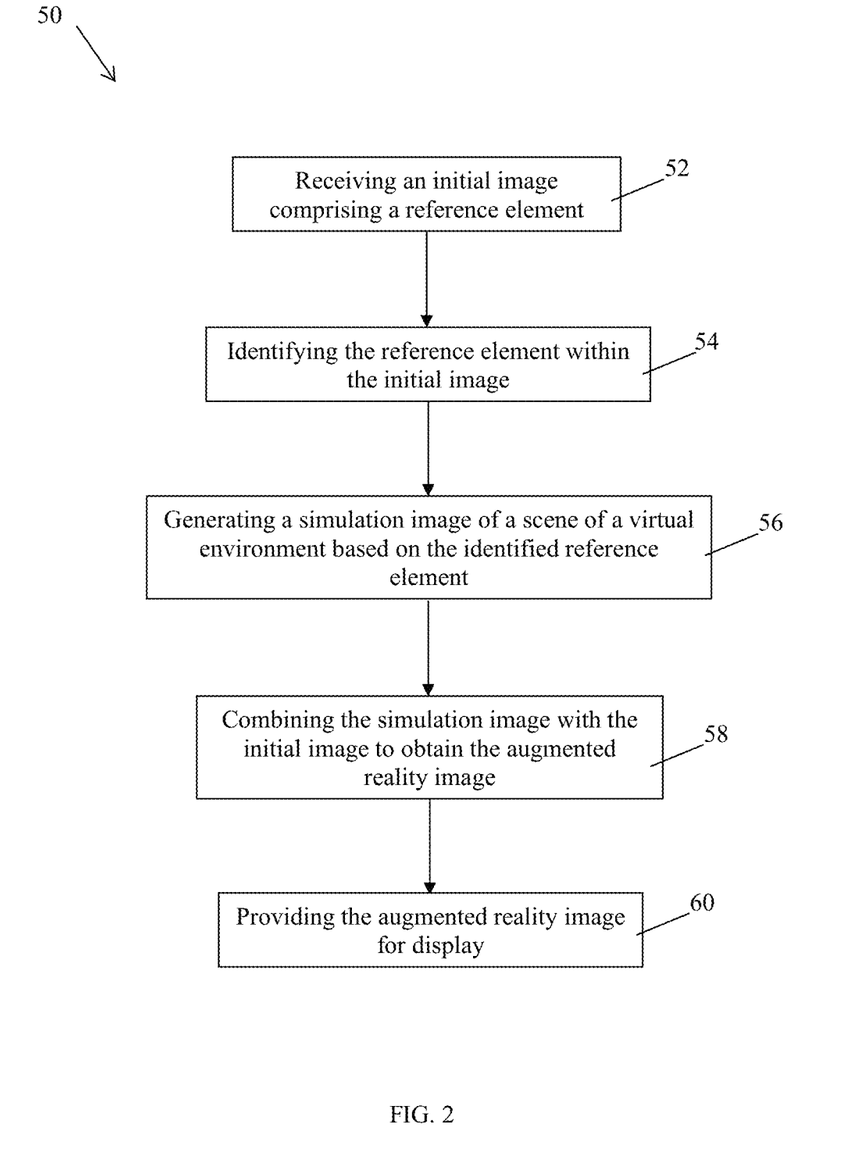
FIG. 2 is a flowchart illustrating a method embodying features of the present technology for generating an augmented reality image, in accordance with an embodiment.

FIG. 2 illustrates one embodiment of a computer-implemented method 50 for generating an augmented reality image. The method 50 may be executed by a computer machine provided with a processing unit or processor, a memory or storing unit and a communication unit or communication interface. However, it will be understood that the method 50 may be executed by more than one processing unit or more than one computer machine.

Figure 3:
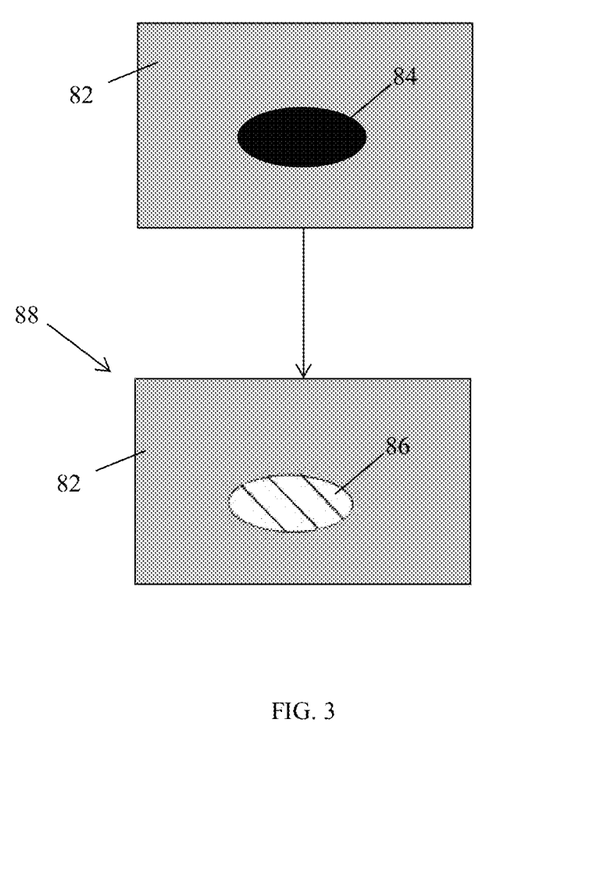
FIG. 3 is a conceptual diagram illustrating an embodiment of the method of FIG. 2 in which a scene is drawn over a reference element of an initial image, in accordance with an embodiment.

Referring to FIG. 2 and FIG. 3, an initial image 82 is received at step 52. The initial image 82 comprises at least a representation of a reference element 84. It will be understood that the initial image 82 may comprise the representation of only a portion of a reference element or only portions of the reference element. It should also be understood that the initial image 82 may comprise the representation of more than one reference element or portions of more than one reference element.

In one embodiment, the reference element 84 is provided with a predefined shape/outline and the identification of the reference element 84 within the initial image 82 may be performed by locating the predefined shape/outline within the initial image 82, as described below.

For example, the reference element 84 may correspond to a window or a porthole present in the frame of a simulator. In this case, shape or object recognition algorithms may be used for identifying the reference element 84 within the initial image 82.

In another embodiment, the reference element 84 corresponds to a marker contained in the initial image 82. For example, the marker may be a predefined geometrical shape such as a cross, a triangle, a disc, etc., associated with a portion of the initial image 82 to be replaced by a simulation image. In another example, the marker may be a barcode such as a Quick Response (QR) code associated with a portion of the initial image 82 to be replaced by a simulation image.

In a further embodiment, the reference element 84 is of a predefined color such as a predefined green color or a predefined blue color, i.e. the pixels of the background image 82 forming the reference element 84 are of the predefined color. In this case, the identification of the reference element 84 within the initial image 82 may be performed by identifying the pixels of the initial image 82 having the predefined color. For example, the color associated with each pixel of the initial image may be compared to the predefined color to determine whether the pixel belongs to the reference element 84. In one embodiment, all of the pixels having the predefined color are identified so that the whole reference element 84 be identified. In another embodiment, only the pixels having the predefined color and corresponding to the outline of the reference element 84 are identified so that only the outline of the reference element 84 be identified.

In one embodiment, the reference element 84 is a representation of at least one screen and/or a portion of a screen. The screen may be provided with a predefined shape and/or a predefined color to be identified within the initial image 82. The screen may be used to simulate a window or a porthole for example.

It should be understood that any adequate method may be used for creating the reference element 84. For example, infrared light which may have a predefined shape and/or size may be projected on the frame of the simulator to generate a reference element. In a further example, depth mapping can be used for creating the reference element 84.

In one embodiment, the method 50 is used for training a user in a simulator. In this case, the simulator may be one conceived to simulate a vehicle such as an aircraft simulator, a helicopter simulator, a tank simulator, an infantry fighting vehicle simulator, or the like. The simulator comprises a frame, walls, a control panel and/or control instruments for allowing the user to control the simulated vehicle as known in the art. The simulator further comprises at least one reference element 84 such as at least one screen. For example, the reference element 84 may be used for simulating a window present in the simulated vehicle.

The simulator further comprises a simulation engine for generating simulation images and a database having stored thereon at least topography information about the simulated terrain and simulated structures such as buildings, walls, trees, bridges, and moving entities such as other vehicles, landable ships, and/or the like. For example, the database may contain information such as the position information, dimension information, information about the material from which a structure is made, and/or the like.

In one embodiment, the initial image 82 exemplifies frames of a video. In this case, the simulator is further provided with a camera directed towards the interior space of the simulator and the video frames captured by the camera correspond to the initial images 82.

In one embodiment, the camera may have a fixed or static position within the simulator. For example, the camera may be fixed to the ceiling of the simulator. In another embodiment, the camera may be positioned on a tripod located within the simulator.

In another embodiment, the camera may have a dynamic position. For example, the camera may be attached to the user of the simulator in order to capture the field of view of the user. In this case, the initial image 82 exemplifies images taken by the camera, each of which shows what the user sees at a specific moment in time during a simulation. In this case, the camera may be fixed onto the head of the user such as on a helmet worn by the user and positioned and oriented so as to image the field of view of the user.

Referring back to FIG. 2, the second step 54 of the method 50 consists in identifying the reference element 84 within the initial image 82. It will be understood that any adequate method for recognizing/identifying a reference object such as the object 84 within an image may be used.

In one embodiment, the identification of the reference element 84 within the initial image 82 consists in identifying the pixels of the initial image 82 that correspond to the reference element 84 (or the pixels that form the outline of the initial image 82) and determining the position of the identified pixels within the initial image 82.

In an embodiment in which the reference element 84 is provided with a predefined shape or outline such as when the reference element 84 corresponds to a marker, a window or porthole, or a screen, any adequate shape/object recognition method may be used for identifying the reference element 84. For example, edge detection or depth sensing using stereoscopy or laser range-finding may be used.

In an embodiment in which the reference element 84 is a barcode such as a QR code, the shape/object recognition method is adapted to identify barcodes. The barcode is then associated with an outline for the simulation image to be combined with the initial image. Furthermore, the position of the barcode within the initial image 82 may be indicative of the position at which the simulation image is to be inserted into the augmented reality image.

In an embodiment in which the reference element 84 is provided with a predefined color, the identification of the reference element 84 within the initial image 82 consists in analyzing the color of the different elements present in the initial image 82 and identifying the element having the predefined color as being the reference element 84. The characteristics of the reference element 84 such as its outline and the position of the reference element 84 within the initial image 82 are then determined from the position of the pixels identified as having the predefined color.

Figure 4:
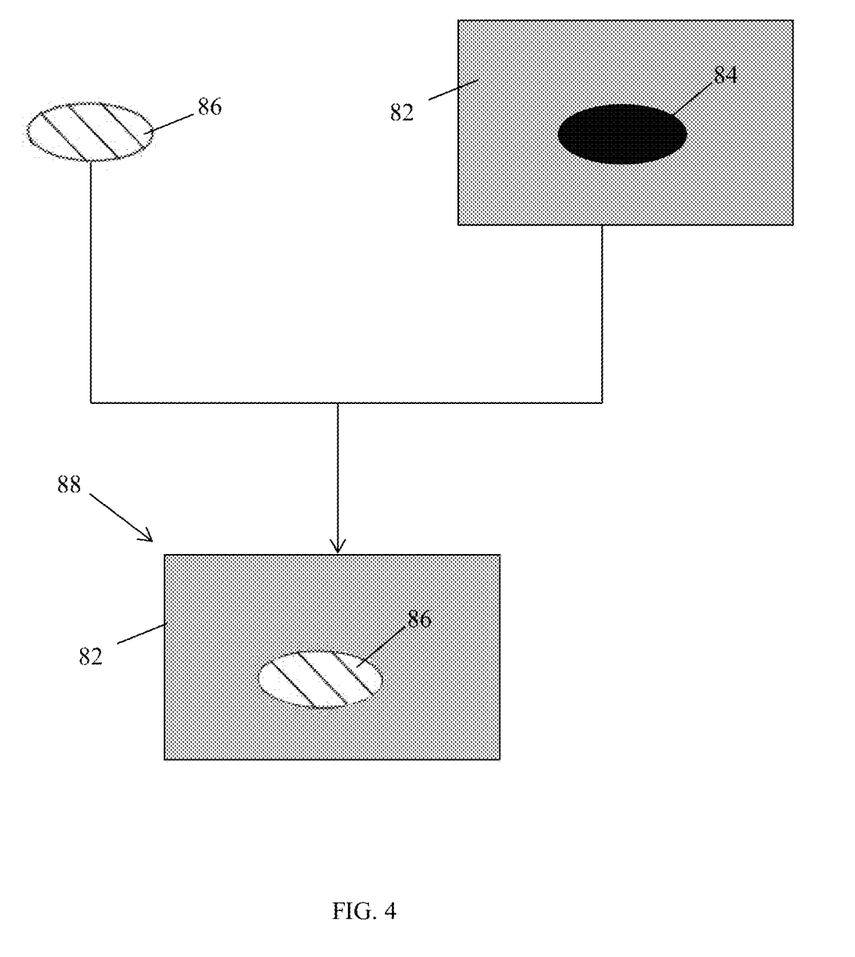
FIG. 4 is a conceptual diagram illustrating another embodiment of the method of FIG. 2 in which a simulation image of a scene having a same outline as an outline of a reference element of an initial image is generated and the simulation image is superimposed over the reference element on the initial image, in accordance with an embodiment.

Referring to FIG. 2 and FIG. 4, the next step 56 of the method comprises generating a simulation image 86 to be combined with the initial image 82. The simulation image 86 is an image of a scene of a virtual environment such as an image of the outdoor that the user of a simulator would have seen through a window of the simulated vehicle. The size of the simulation image 86 is less than or equal to that of the initial image. The simulation image 86 is generated based on an outline hereinafter referred to as the simulation image outline. In one embodiment, the simulation image outline corresponds to the physical or real outline of the reference element 84 so that the shape and size of the simulation image 86 are identical to the shape and size of the reference element 84, respectively. This is the case when the reference element 84 corresponds to a window or porthole, a screen or when the reference element 84 is provided with a predefined color. In another embodiment, a predefined outline is associated with the reference element 84 and the predefined outline associated with the reference element 84 is independent from the physical or real outline of the reference element 84. This is the case when the reference element 84 is a marker such as a cross or a barcode. In this case, the method 50 further comprises the steps of determining the predefined outline associated with the reference element 84 before generating the simulation image 86, and assigning the determined predefined outline associated with the reference element 84 to the simulation image 86 so that the simulation image outline corresponds to the determined predefined outline associated with the reference element 84. The predefined outline associated with the reference element 84 may be determined using a database storing predefined outlines each for a respective marker, using a mapping function or the like. In an embodiment in which the reference element 84 is a barcode such as a QR code, the predefined outline may be encoded in the barcode. In this case, the method 50 further comprises a step of extracting the predefined outline from the barcode such as the QR code using any adequate algorithm.

While the simulation image 86 is generated so that the simulation image outline corresponds to the outline associated with the reference element 84, the person skilled in the art will understand that several steps may be executed in order to obtain the simulation image 86 having the same outline as that associated with the reference element 84. A first image having an outline different from the outline associated with the reference element 84 may be first generated and then resized/rescaled to obtain the simulation image 86. For example, a first image having an outline larger than the outline associated with the reference element 84 may be first generated and then downsized to obtain the simulated image 86 of which the simulation image outline corresponds to the outline associated with the reference element 84, in order to obtain a high resolution for the simulation image 86 when requested or required for example. In another example, a first image having an outline smaller than the outline associated with the reference element 84 may be first generated and then expanded to obtain the simulated image 86 of which the simulation image outline corresponds to the outline associated with the reference element 84. For example, such a method for generating the simulation image 86 may be used when a low resolution for the simulation image 86 is acceptable or requested.

In one embodiment, the simulation image 86 is generated further based on a given position. In one embodiment, the given position corresponds to the position of the reference element 84 within the initial image 82. This is the case when the reference element 84 corresponds to a window or porthole, a screen or when the reference element 84 is provided with a predefined color. This may also be the case when the reference element 84 is a marker such as a cross or a barcode. For example, the given position may be the position of the center of the reference element 84. In another embodiment such as when the reference element 84 is a marker, the given position may be independent of the position of the reference element 84. In this case, the method 50 further comprises a step of determining the given position associated with the simulation image 86 before generating the simulation image 86. The given position may be determined using a database storing predefined given positions each for a respective marker, using a mapping function or the like. In an embodiment in which the reference element 84 is a barcode such as a QR code, the given position associated with the simulation image 86 may be encoded in the barcode. In this case, the method 50 further comprises a step of extracting the given position from the barcode such as the QR code using any adequate algorithm.

Then at step 58, the generated simulation image 86 and the initial image 82 are combined to create an augmented reality image 88. The initial image 82 then corresponds to a background image 82 relative to the simulation image 86 which corresponds to a foreground image.

In one embodiment, the steps 56 and 58 are performed concurrently while the scene of the simulation image 86 is drawn over the initial image 82 based on the determined outline so that the drawn scene has the same outline as that determined for the simulation image 86, i.e. the outline associated with the reference element 84. In an embodiment, in which the reference element 84 corresponds to a section of the initial image 86, the scene is drawn over the reference element 84. In an embodiment in which the reference element 84 corresponds to a marker, the scene is drawn according the given position associated with the simulation image 86 which may be the position of the marker or a determined position as described above.

In another embodiment depicted in FIG. 4, the step 58 of combining the simulation image 86 and the initial image 82 consists in overlaying the initial image 82 with the simulation image 86, i.e. inserting the simulation image 86 over the reference element 84 within the initial image 82 to obtain the augmented reality image 88.

Figure 5:
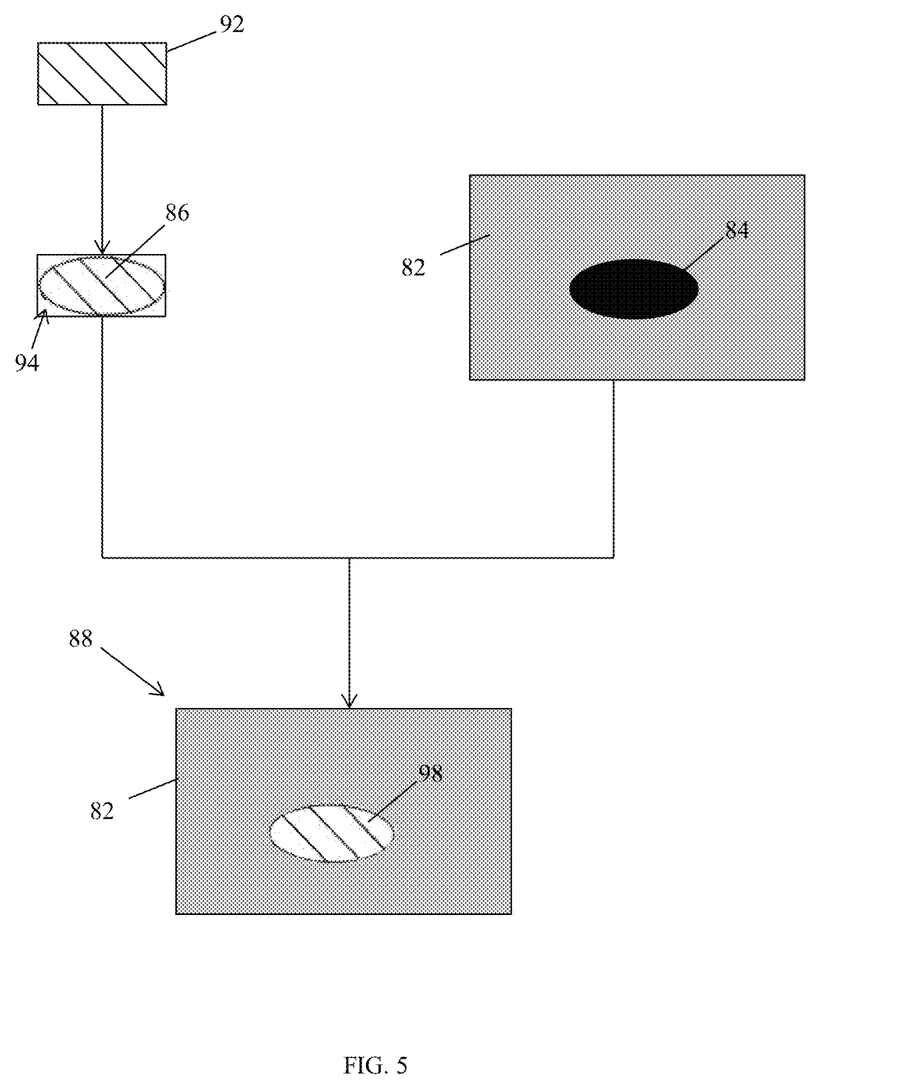
FIG. 5 is a conceptual diagram illustrating another embodiment of the method of FIG. 2 in which a first image of a scene is generated, some pixels of the first image are rendered to obtain a simulation image having an outline different from an outline of a reference element of an initial image and the simulation image is superimposed over the reference element on the initial image, in accordance with an embodiment.

In a further embodiment depicted in FIG. 5, the step 56 of generating the simulation image 86 consists in generating a first image 92 of a scene having an outline being larger than the outline associated with the simulation image 86, and then cropping the first image to obtain the simulation image 86, i.e. rendering transparent some pixels 94 of the first image 92 to obtain the simulation image 86. The first generated image 92 has a rectangular or square shape and a size chosen so that the outline associated with the simulation image 86 would fit thereinto. The content of the first generated image 92 may be created according to the given position associated with the simulation image 86 such as the position of the reference element 84 within the initial image 82. Once the first generated image 92 has been generated, some pixels 94 are rendered transparent to obtain the simulation image 86. The selection of the transparent pixels 94 is performed according to the desired outline for the simulation image 86 so that the remaining pixels which are not transparent form a foreground image portion 98 which has the desired outline. The thusly obtained simulation image 86 is positioned over the background image 82 so that the foreground image portion 98 covers the reference element 82 to obtain the augmented reality image 88.

In one embodiment, the initial image 92 is generated using the two-step approach described above. An image having an outline larger than the outline of the first image 92 may be first generated, and then downsized to obtain the initial image 92. Alternatively, an image having an outlie smaller than the outline of the first image 92 may be generated and then expanded to obtain the first image 92.

In one embodiment, the size/outline of the first image 92 may be minimized as long it contains therein the outline for the simulation image 86.

Referring back to FIG. 2, once it has been created at step 58, the augmented reality image 88 is provided for display at step 60. In one embodiment, the augmented reality image 88 is stored in memory. In the same or another embodiment, the augmented reality image 88 is transmitted to a display unit to be displayed thereon.

In one embodiment, the display may be a portable display to be worn by the user of the simulator. For example, the display may be secured to a helmet to be worn by the user.

In one embodiment, the identification of the reference element 84 within the initial image 82 is performed by an image analyzer while the augmented reality image 88 is generated by an image generator subsystem which may comprise an image generator and an image combiner as described below. In this case, the method 50 comprises a step of transmitting the outline and for the simulation image 86 from the image analyzer to the image generator. In one embodiment, the transmission step consists in transmitting an identification of the pixels of the initial image 82 that form the reference element 84.

In one embodiment, the position of the identified pixels is transmitted from the image analyzer to the image generator. For example, a table comprising a line per identified pixel and x and y positions per line may be transmitted to the image generator.

In another embodiment, a channel of the initial image 82 other than a color channel is used for identifying the pixels that form the reference element 84. In this case, the channel value of the pixels identified as forming the reference element 84 is changed to a predefined value, thereby obtaining a modified initial image. The step of transmitting the information about the reference element 84 to the image generator subsystem then consists in transmitting the modified initial image to the image generator.

In one embodiment, the image channel used for transmitting the information about the reference element 84 is an alpha channel, a stencil channel, a depth channel or the like.

In a further embodiment, a color channel such as an RGB channel or a CMYK channel may be used for transmitting the information about the reference element 84. For example, if a particular color channel of the image is not used, this particular color channel may be used for transmitting the information about the reference element 84. For example, if an image does not contain any red, the red color channel may be used for transmitting the information about the reference element. For example, a predefined value may be assigned in the red color channel for each pixel representing the reference element.

In an embodiment in which the camera captures the field of view of the user of the simulator, the method 50 further comprises a step of receiving the line of sight of the user. In one embodiment, the line of sight of the user is represented by the position and orientation of the head of the user.

In one embodiment, the method 50 may further comprise a step of tracking the line of sight of the user. It will be understood that any adequate tracking device for determining the line of sight of the user or the position and orientation of the user's head may be used.

When the camera captures the field of view of the user, the step 56 of generating the simulation image 86 is further performed according to the line of sight of the user.

In one embodiment, the method 50 is performed in real-time. For example, the method 50 may generate augmented reality images by combining real-time captured video images and real-time simulation rendered images.

In one embodiment, the above-described method 50 may be embodied as a computer program product for generating an augmented reality image, the computer program product comprising a computer readable memory storing computer executable instructions thereon that when executed by a computer perform the steps of the above described method 50.

In another embodiment, the above-described method 50 may be performed by a system for generating an augmented reality image, the system comprising a communication unit for at least one of receiving and transmitting data, a memory and at least one processing unit configured for executing the steps of the above described method 50.

Figure 6:
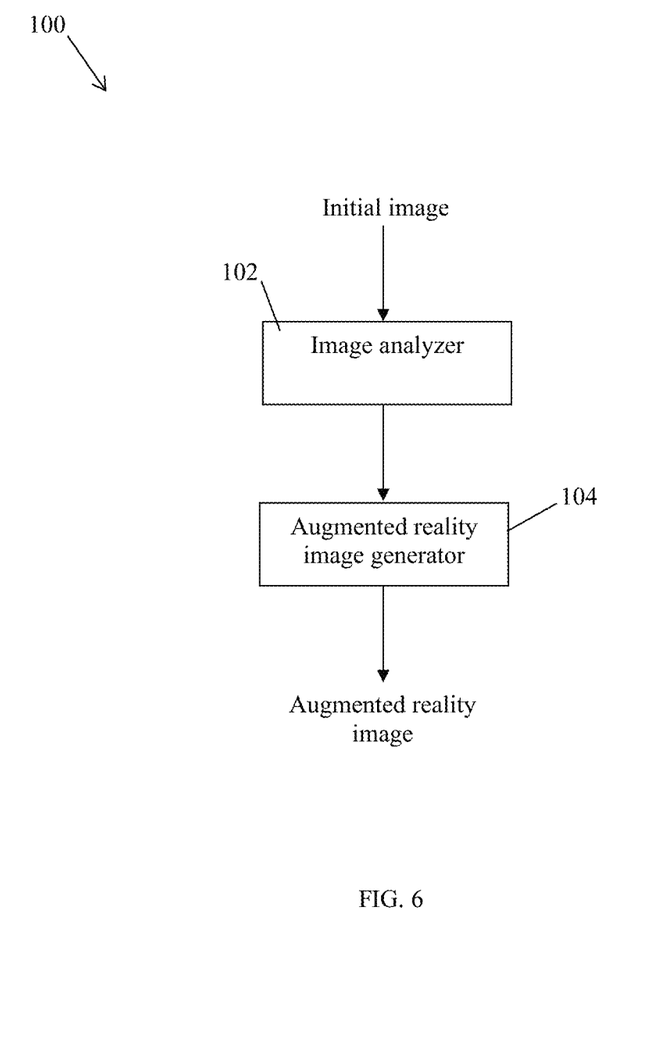
FIG. 6 is a block diagram illustrating an embodiment of a system adapted to execute at least some of the steps of the method of FIG. 2.

FIG. 6 illustrates one embodiment of a system 100 for generating an augmented reality image. The system 100 comprises an image analyzer 102 and an augmented reality image generator 104. In one embodiment, the image analyzer 102 and the augmented reality image generator 104 are each be provided with a respective processor or processing unit, a respective memory and respective communication means. In another embodiment, the image analyzer 102 and the augmented reality image generator 104 share a same processor or processing unit, a same memory and/or same communication means.

The image analyzer 102 is configured for receiving an initial image such as the initial image 82. As described above, the initial image 82 comprises at least a representation of a reference element such as the reference element 84. The image analyzer 102 is configured for identifying the reference element within the initial image 82 and determining the outline and position for the simulation image 86 to be generated using the method described above.

As described above, the outline and/or the position for the simulation image 86 may correspond to the outline and/or position of the reference element 84. In this case, the image analyzer 102 is configured for determining the outline and/or the position of the reference element 84. In another embodiment, the outline and/or the position for the simulation image 86 is independent of the outline and/or position of the reference element 84. In this case the image analyzer 102 is configured for determining the outline and/or position for the simulation image 86 based on the reference element 84 such as based on a QR code, as described above.

In one embodiment, the initial image 82 is a video frame of a video. In one embodiment, the camera used for taking the initial image 82 may have a fixed or static position. In another embodiment, the camera may have a dynamic position. For example, the camera may be attached to a user in order to capture the field of view of the user.

In an embodiment in which the reference element 84 is provided with a predefined shape such as when the reference element 84 is a marker, a window or a screen, the image analyzer 102 is configured for performing shape recognition in order to identify the reference element 84 within the initial image 82, i.e. identifying the outline and/or position within the initial image 82 of the reference element 84. It will be understood that any adequate method for identifying a predefined shape within an image may be used. For example, spectral shape analysis may be used. In another example, pattern recognition using artificial neural networks and deep learning may be performed by the image analyzer 102. In this embodiment, the predefined shape of the reference element 84 is stored in memory. The image analyzer 102 detects and identifies the shape of the elements contained in the initial image 82 and compares the identified shapes to the predefined shape stored in memory to identify the reference element 84.

In an embodiment in which the reference element 84 is provided with a predefined color such as a predefined green color or a predefined blue color, the image analyzer 102 is configured for comparing the color of each pixel of the initial image 82 to the predefined image in order to identify at least the outline of the reference element 84 within the initial image 82. When the image analyzer 102 determines that the color of a given pixel substantially corresponds to the predefined color, the given pixel is considered as belonging to the reference element 84 to be identified. The position of the reference element 84 within the initial image 82 and the outline of the reference element 84 are then obtained from the position within the initial image 82 of the pixels that are identified as having the predefined color.

In an embodiment in which the outline and/or position of the simulation image within the augmented reality image for the simulation image 86 correspond to the outline and/or position within the initial image 82 of the reference element 84, the image analyzer 102 is configured for outputting the outline and/or position within the initial image 82 of the reference element 84.

In an embodiment in which the outline for the simulation image 86 is independent of the outline of the reference element 84 such as when the reference element 84 is a marker, the image analyzer 102 is configured for determining the outline for the simulation image 86 using the above described method. For example, when the reference element 84 is a QR code and the outline for the simulation image 86 is encoded into the QR code, the image analyzer 102 may be configured for extracting the outline for the simulation image 86 using any adequate algorithm. In another example, the outline for the simulation image 86 may be determined using a database as described above.

In an embodiment in which the position for the simulation image 86 within the augmented reality image is independent of the position of the reference element 84 within the initial image 82, the image analyzer 102 is configured for determining the position for the simulation image 86 within the augmented reality image based on the reference element 84. For example, when the reference element 84 is a QR code and the position for the simulation image 86 is encoded into the QR code, the image analyzer 102 may be configured for extracting the position for the simulation image 86 from the QR code using any adequate algorithm. In another example, the position for the simulation image 86 may be retrieved from a database as described above.

In one embodiment, the transmission step consists in transmitting an identification of the pixels of the initial image 82 that correspond to the reference element 84 from which the outline of the simulation image 86 and the desired position of the simulation image 86 within the augmented reality image may be determined. For example, a table comprising a line per identified pixel and x and y positions per line may be transmitted to the augmented reality image generator 104.

In another embodiment, a given channel of the initial image 82 other than a color channel is used for identifying the pixels that form the reference element. In this case, the image analyzer 102 is further configured for identifying the pixels belonging to the reference element 84 or the outline of the reference element 84 within the given channel. For example, the image analyzer 102 may assign a predefined value to each pixel associated with the reference element 84 within the given channel of the initial image 82. The image analyzer 102 then transmits the initial image 82 having the modified given channel to the augmented reality image generator 104. For example, the channel to be modified to identify the pixels belonging to the reference element 84 may be an alpha channel, a stencil channel, a depth channel or the like.

In a further embodiment, a color channel such as an RGB channel or a CMYK channel may be used for identifying the pixels representing the reference element 84 within the initial image 82. For example, if a particular color channel of the initial image 82 is not used, the image analyzer 102 may assign a predefined value to each pixel associated with the reference element 84 within the unused color channel.

The augmented reality image generator 104 is configured for receiving the initial image, generating a simulation image 86 and combining the simulation image 86 and the initial image 82 to obtain the augmented reality image. The simulation image 86 may be an image of a scene. The initial image 82 then corresponds to a background image relatively to the simulation image 86, i.e. the simulation image 86 is to be superimposed/overlaid/drawn over the initial image 82.

The augmented reality image generator 104 receives the information about the simulation image 86, i.e. the outline for the simulation image 86 and the position of the simulation image 86 within the augmented reality image, and generates the simulation image 86 using the received information.

In an embodiment in which the information about the reference element 84 is provided by the identification of the pixels that represent the reference element 84 within the initial image 82 or the outline of the reference element 84, the augmented reality image generator 104 determines the position of the identified pixels within the initial image 82 to determine the outline and position within the initial image 82 of the reference element 84, which correspond to the outline and position within the augmented reality image for the simulation image 86. The augmented reality image generator 104 then generates the simulation image 86 as a function of the outline and combines the generated simulation image 86 within the initial image 82 at the received position.

In an embodiment in which a given channel of the initial image is modified to identify the pixels that represent the reference element 84, the augmented reality image generator 104 compares the values of each pixel for the given channel to a predefined value and identifies the pixels that represent the reference element 84 based on the comparison. Pixels having a given channel value substantially equal to the predefined value are considered as representing the reference element 847. The outline and position for the simulation image 86 are then given by the position of the identified pixels within the given channel.

It will be understood that when a given channel of the initial image is used for transmitting the information about the reference element 84, the augmented reality image generator 104 receives the initial image 82 having the given channel. In an embodiment in which the transmission of the information about the reference element 84 is independent of the initial image 82, e.g. when a table comprising the position of the identified pixels is transmitted to the augmented reality image generator 104, it will be understood that the initial image 82 is further sent to the augmented reality image generator 104.

In one embodiment, the step of combining the simulation image 86 of the scene with the initial image 82 consists in drawing over the initial image, as illustrated in FIG. 3. In this case, the augmented reality image generator 104 may be configured for drawing a scene or a portion of a scene over the reference element 84 within the initial image 82 to obtain the augmented reality image. The scene to be drawn, i.e. the content, the outline and position within the initial image of the scene to be drawn, is determined according to the outline of the reference element 84 and the position of the reference element 84 within the initial image 82.

In another embodiment, the augmented reality image generator 104 is configured for creating a simulation image 86 of a scene according to the outline and position determined for the simulation image 86. As described above, the outline and/or position for the simulation image 86 may correspond to the outline and/or position of the reference element 84. In another embodiment, the outline and/or position for the simulation image 86 may not correspond to the outline and/or position of the reference element 84, as described above. The augmented reality image generator 104 is further configured for inserting or positioning the generated simulation image 86 over the reference element in the initial image 82 to obtain the augmented reality image.

It will be understood that the size of the simulation image 84 is less than or equal to that of the initial image 82.

In one embodiment, the augmented reality image generator 104 is configured for generating a first image 92 of a scene, then rendering transparent some pixels 94 of the first image to obtain the simulation image 86 and combining the thus-obtained simulation image 86 with the initial image 82, i.e. superimposing/overlaying the simulation image 86 over the reference element 84 within the initial image 82, as illustrated in FIG. 5. The first generated image 92 may have a predefined shape such as a rectangular shape and the augmented reality image generator 104 is configured for adequately determining the size/outline of the first image 92 so that the outline for the simulation image 86 fits into the first image 92. The augmented reality image generator 104 then creates a first scene for the first image 92 according to the position for the simulation image 86 within the augmented reality image. Once the first image 92 has been created, the augmented reality image generator 104 renders some pixels 94 of the first image 92 transparent so that the outline of the resulting image corresponds to the outline for the simulation image 86. The resulting image then corresponds to the simulation image 86. The augmented reality image generator 104 identifies the pixels to be rendered transparent based on the outline for the simulation image 86 and optionally the position associated with the simulation image 86 so that the remaining pixels which are not rendered transparent form the desired simulation image 86 which has the desired outline.

In one embodiment, the augmented reality image generator 104 may be configured to minimize the size of the first image 92 as long it may contain the outline for the simulation image 86 therein.

Once generated, the augmented reality image is provided by the augmented reality image generator 104 for display. For example, the augmented reality image generator 104 may store the augmented reality image in memory. In the same or another example, the augmented reality image generator 104 may transmit the augmented reality image to a display unit to be displayed thereon.

As described above, the display may be a portable display to be worn in front of the eyes of the user of the simulator. For example, the display may be secured to a helmet to be worn by the user.

As described above, the initial image may be an image captured by a camera. In one embodiment, the camera may have a fixed position and a fixed field of view. In another embodiment, the camera may be a camera configured for capturing the field of view of the user of a simulator. For example, the camera may be fixed to the head of the user such as on a helmet worn by the user, to capture the field of view of the user. In this case, the augmented reality image generator 104 is further configured for receiving the line of sight of the user and generating the simulation image based on the line of sight of the user.

In one embodiment, the line of sight of the user may be determined from the position and orientation of the head of the user. In this case, the augmented reality image generator 104 may be configured for receiving the position and orientation of the head of the user and determining the line of sight of the user.

It will be understood that any adequate tracking device for determining the line of sight of the user or the position and orientation of the user's head may be used, and that the tracking device and the camera may be part of the system 100.

In one embodiment, the system 100 operates in substantially real-time.

Figure 7:
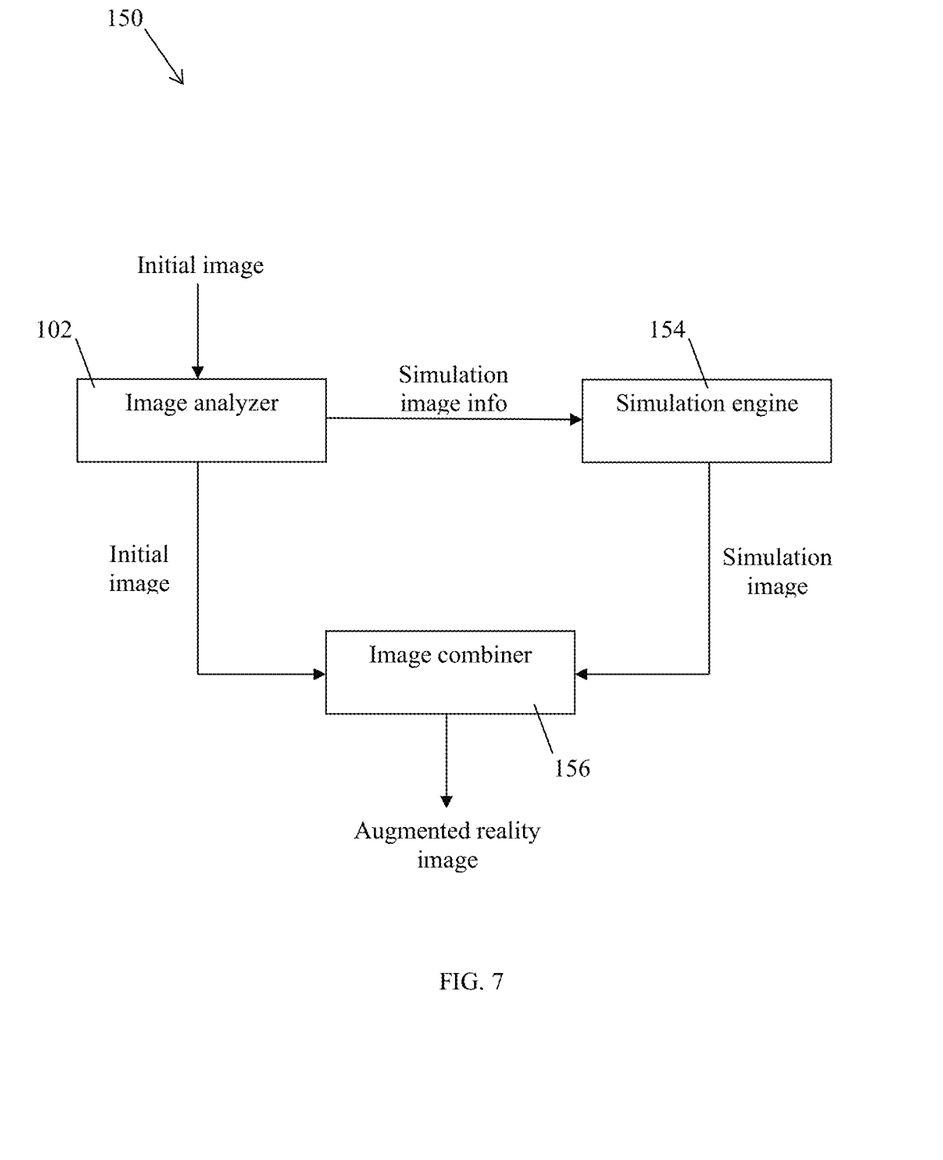
FIG. 7 is a block diagram illustrating another embodiment of a system adapted to execute at least some of the steps of the method of FIG. 2, the system comprising an image analyzer, a simulation engine and an image combiner.

While in the system 100, the generation of the simulation image 86 and the combination of the simulation image 86 with the initial image 82 are performed by a same component/unit, i.e. the augmented reality image generator 104, it will be understood that the simulation image generation and the combination step may be performed by two separate components/units as illustrated in FIG. 7.

FIG. 7 illustrates one embodiment of a system 150 to be used for training a user in a simulator. The simulator may be a vehicle simulator such as an aircraft simulator, a helicopter simulator, a tank simulator, an infantry fighting vehicle simulator, or the like. The simulator comprises at least one reference element 84 such as at least one green or blue screen or a barcode. For example, the reference element 84 may be used for simulating a window present in the simulated vehicle.

The system 150 comprises the image analyzer 102, a simulation engine 154 for generating simulation images and an image combiner 156 for generating augmented reality images. The simulation engine 154 comprises or is in communication with a database having stored thereon at least topography information about the simulated terrain and simulated structures such as buildings, walls, trees, bridges, and moving entities such as other vehicles, landable ships, and/or the like. For example, the database may contain information such as the position information, dimension information, information about the material from which a structure is made, and/or the like.

In an embodiment in which the outline and/or position for the simulation image 86 is different from the outline and/or the position of the reference element 84 within the initial image 82, the database comprises a respective outline and/or a respective position within the augmented reality image for each possible reference element 84.

The simulation engine 154 is configured for receiving from the image analyzer 102 the information about the simulation image 86, i.e. the outline for the simulation image 86 and optionally the position of the simulation image 86, and generating the scene to be displayed in replacement of the reference element 84 of the initial image 82, i.e. it is configured for generating the simulation image 86 following the process described above with respect to the augmented reality image generator 104. The simulation engine 154 is further configured for transmitting the generated simulation image 86 to the image combiner 156.

The image combiner 156 is configured for receiving the initial image 82, the position for the simulation image and the simulation image generated by the simulation engine 154 and combining the initial image 82 and the simulation image 86. For example, the image combiner 156 may superimpose the simulation image 86 over the reference element 84 in the initial image 82 to obtain the augmented reality image. The image combiner 156 is further configured for outputting the augmented reality image, i.e. providing the augmented reality image for display. In one embodiment, the image combiner 156 stores the generated augmented reality image in memory from which it may be accessed by a display for display purposes. In the same or another embodiment, the image combiner 156 is configured for transmitting the generated augmented reality image to a display to be displayed thereon. For example, the display may be a wearable display worn by the user of the simulator.

In an embodiment in which a first image 92 is generated and some pixels 94 of the generated first image 92 are rendered transparent to obtain the simulation image 86, the simulation engine 154 may be configured to both generate the first image 92, render transparent some of the pixels 94 of the first image 92 to obtain the simulation image 86 and transmit the simulation image 86 to the image combiner 156. In another embodiment, the simulation engine 154 is configured for generating the first image 92 and transmitting the first image 92 to the image combiner 156. The image combiner 156 is then configured for receiving the first image 92 and rendering transparent some of the pixels 94 of the first image 92 to obtain the simulation image 86, as described above.

Figure 8:
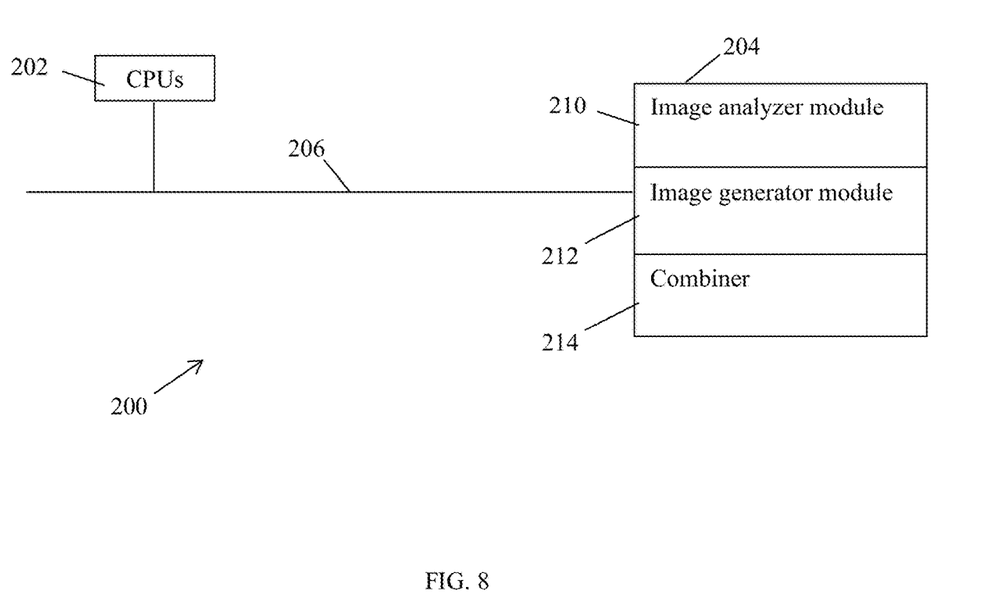
FIG. 8 is a block diagram illustrating an exemplary processing module adapted to execute at least some of the steps of the method of FIG. 2.

FIG. 8 is a block diagram illustrating an exemplary processing module 200 for executing the steps 52 to 58 of the method 50, in accordance with some embodiments. The processing module 200 typically includes one or more Computer Processing Units (CPUs) and/or Graphic Processing Units (GPUs) 202 for executing modules or programs and/or instructions stored in memory 204 and thereby performing processing operations, memory 204, and one or more communication buses 206 for interconnecting these components. The communication buses 206 optionally include circuitry (sometimes called a chipset) that interconnects and controls communications between system components. The memory 204 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 204 optionally includes one or more storage devices remotely located from the CPU(s) 202. The memory 204, or alternately the non-volatile memory device(s) within the memory 204, comprises a non-transitory computer readable storage medium. In some embodiments, the memory 204, or the computer readable storage medium of the memory 204 stores the following programs, modules, and data structures, or a subset thereof:

- an image analyzer module 210 for receiving an initial image, identifying a reference element in the initial image and determining an outline and a position for a simulation image of a scene to be generated, as described above; and
- an image generator module 212 for generating the simulation image of the scene using at least the outline associated with the simulation image; and
- a combiner module 214 for combining the simulation image and the initial image using the position associated with the simulation image to obtain an augmented reality image and providing the augmented reality image for display.

Each of the above identified elements may be stored in one or more of the previously mentioned memory devices and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 84 may store a subset of the modules and data structures identified above. Furthermore, the memory 84 may store additional modules and data structures not described above.

Although it shows a processing module 200, FIG. 8 is intended more as functional description of the various features which may be present in a management module than as a structural schematic of the embodiments described herein. In practice, and as recognized by the person skilled in the art, items shown separately could be combined and some items could be separated. For example, the augmented reality image generator module may be split into two modules, i.e. a simulation engine module and an image combiner module.

The embodiments of the invention described above are intended to be exemplary only. The scope of the invention is therefore intended to be limited solely by the scope of the appended claims.

We claim:

1. A computer-implemented method for generating an augmented reality image using an initial image comprising a reference element, the computer-implemented method comprising:
   identifying the reference element within the initial image; a reference outline being associated with the reference element;
   generating a simulation image of a scene of a virtual environment based on the identified reference element, an outline of the simulation image corresponding to the reference outline;
   overlaying the initial image with the simulation image to obtain the augmented reality image; and
   providing the augmented reality image for display;
   wherein one of a position of the reference element within the initial image and information associated with the reference element is indicative of a position at which the simulation image is to be inserted into the augmented reality image; and
   wherein one of:
      a shape and a size of the simulation image are identical to a shape and a size of the reference element, respectively; and
      the outline of the simulation image is determined from the reference element.

2. The computer-implemented method of claim 1, wherein said generating the simulation image and said overlaying the initial image with the simulation image are performed concurrently by drawing the scene of the virtual environment over the reference element within the initial image.

3. The computer-implemented method of claim 1, wherein said generating the simulation image comprises:
   generating a first image of the scene of the virtual environment, an outline of the first image being one of larger than the reference outline and smaller than the reference outline; and
   when the outline of the first image is larger than the reference outline, downsizing the first image to obtain the simulation image; and
   when the outline of the first image is larger than the reference outline, expanding the first image to obtain the simulation image.

4. The computer-implemented method of claim 1, wherein the reference outline is different from a physical outline of the reference element, the computer-implemented method further comprising determining the reference outline.

5. The computer-implemented method of claim 4, wherein the position of the simulation image within the augmented reality image is different from the position of the reference element within the initial image, the computer-implemented method further comprising determining the position of the simulation image within the augmented reality image.

6. The computer-implemented method of claim 4, wherein the reference element is a marker.

7. The computer-implemented method of claim 1, wherein the reference outline is a physical outline of the reference element, and the position of the simulation image within the augmented reality image is identical to the position of the reference element within the initial image.

8. The computer-implemented method of claim 1, wherein said generating the simulation image comprises:
   generating a first image of the scene having a rectangular shape, an outline of the first image being larger than the outline of the simulation image; and
   rendering transparent some pixels of the first image, thereby obtaining the simulation image.

9. The computer-implemented method of claim 1, wherein the reference element is provided with a predefined color, said identifying the reference element comprising identifying image pixels having the predefined color within the initial image.

10. The computer-implemented method of claim 1, wherein the initial image is associated with a line of sight of a user and the simulation image is generated further based on the line of sight of the user.

11. A system for generating an augmented reality image using an initial image comprising a reference element, the system comprising:
   an image analyzer for identifying the reference element within the initial image; and
   an image generating unit for:
      generating a simulation image of a scene of a virtual environment based on the identified reference element, an outline of the simulation image corresponding to the reference outline;
      overlaying the initial image with the simulation image to obtain the augmented reality image; and
      providing the augmented reality image for display;
   wherein one of a position of the reference element within the initial image and information associated with the reference element is indicative of a position at which the simulation image is to be inserted into the augmented reality image; and
   wherein one of:
      a shape and a size of the simulation image are identical to a shape and a size of the reference element, respectively; and
      the outline of the simulation image is determined from the reference element.

12. The system of claim 11, wherein the image generating unit is configured for drawing the scene of the virtual environment over the reference element within the initial image, thereby concurrently performing said generating the simulation image and said combining the initial image and the simulation image.

13. The system of claim 11, wherein the image generating unit comprises:
   a simulation image generator for generating the simulation image; and an image combiner for overlaying the initial image with the simulation image to obtain the augmented reality image and providing the augmented reality image for display.

14. The system of claim 13, wherein the simulation image generator is configured for:
  generating a first image of the scene of the virtual environment, an outline of the first image being one of larger than the reference outline and smaller than the reference outline; and
  when the outline of the first image is larger than the reference outline, downsizing the first image to obtain the simulation image; and
  when the outline of the first image is larger than the reference outline, expanding the first image to obtain the simulation image.

15. The system of claim 11, wherein the reference outline is different from a physical outline of the reference element, the image analyzer being further configured for determining the reference outline.

16. The system of claim 15, wherein the position of the simulation image within the augmented reality image is different from the position of the reference element within the initial image, the image analyzer being further configured for determining the position of the simulation image within the augmented reality image.

17. The system of claim 11, wherein the reference outline is a physical outline of the reference element, and the position of the simulation image within the augmented reality image is identical to the position of the reference element within the initial image.

18. The system of claim 13, wherein the simulation image generator is configured for:
  generating a first image of the scene having a rectangular shape, an outline of the first image being larger than the outline of the simulation image; and
  rendering transparent some pixels of the first image, thereby obtaining the simulation image.

19. The system of claim 11, wherein the reference element is provided with a predefined color, said identifying the reference element comprising identifying image pixels having the predefined color within the initial image.

20. A non-transitory computer program product for generating an augmented reality image using an initial image comprising a reference element, the computer program product comprising a non-volatile memory storing computer executable instructions thereon that when executed by a computer perform the method steps of:
  identifying the reference element within the initial image; a reference outline being associated with the reference element;
  generating a simulation image of a scene of a virtual environment based on the identified reference element, an outline of the simulation image corresponding to the reference outline;
  overlaying the initial image with the simulation image to obtain the augmented reality image; and
  providing the augmented reality image for display
wherein one of a position of the reference element within the initial image and information associated with the reference element is indicative of a position at which the simulation image is to be inserted into the augmented reality image; and
wherein one of:
  a shape and a size of the simulation image are identical to a shape and a size of the reference element, respectively; and
  the outline of the simulation image is determined from the reference element.

* * * * *